United States Patent
Hong et al.

(10) Patent No.: US 10,204,449 B2
(45) Date of Patent: Feb. 12, 2019

(54) VIDEO-BASED INTERACTIVE VIEWING ALONG A PATH IN MEDICAL IMAGING

(71) Applicant: Siemens Healthcare GmbH, Erlangen (DE)

(72) Inventors: Wei Hong, Edison, NJ (US); John Paulus, Jr., East Windsor, NJ (US); Daphne Yu, Yardley, PA (US); Kaloian Petkov, Lawrenceville, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 524 days.

(21) Appl. No.: 14/842,410

(22) Filed: Sep. 1, 2015

(65) Prior Publication Data

US 2017/0061687 A1 Mar. 2, 2017

(51) Int. Cl.
*G06T 19/00* (2011.01)
*G06F 3/0484* (2013.01)
(Continued)

(52) U.S. Cl.
CPC ........ *G06T 19/003* (2013.01); *G06F 3/04815* (2013.01); *G06F 3/04842* (2013.01);
(Continued)

(58) Field of Classification Search
CPC . G06T 19/003; G06T 11/206; G06T 2210/41; G06T 2207/10016;
(Continued)

(56) References Cited

U.S. PATENT DOCUMENTS

| | | | | |
|---|---|---|---|---|
| 5,872,575 A | * | 2/1999 | Segal | G06T 15/00 345/473 |
| 6,144,985 A | * | 11/2000 | Rompe | B07C 3/20 382/101 |

(Continued)

OTHER PUBLICATIONS

Li, Bo, Qionghai Dai, and Guihua ER. "Reverse Playback in H. 264 Video Streaming System Based on Dual-Stream and SP-Frames." Jun. 2009.

(Continued)

*Primary Examiner* — Kieu D Vu
*Assistant Examiner* — Alvaro R Calderon, IV

(57) ABSTRACT

For interactive viewing in medical imaging, pre-rendering is used to provide greater quality of the rendered images with a given computational power. For interactivity in viewing direction, two or more views are rendered for each location and provided as video to the viewer. The viewer selects a viewing direction interactively, and an image at the selected view direction is formed from the previously rendered images of the videos for the two or more views. In an alternative or additional approach, a video graph is created with videos of different segments of the graph. The videos are sequences of images representing change in location, camera parameters (e.g., zooming), and/or rendering settings. Once provided to the user, interactivity is provided by selection of the appropriate node of the video graph. The user may interactively select different locations and/or rendering settings available in the video graph, allowing interaction while benefiting from quality provided by pre-rendered video.

5 Claims, 6 Drawing Sheets

(51) Int. Cl.
*G06F 3/0481* (2013.01)
*G11B 27/30* (2006.01)

(52) U.S. Cl.
CPC ........ *G06F 3/04845* (2013.01); *G11B 27/309* (2013.01); *G06T 2210/41* (2013.01)

(58) Field of Classification Search
CPC ........... G06T 2207/30004; G06T 15/00; G06F 3/048–3/04897; G06F 17/30061; G06F 3/04815; G06F 2203/04802; G06F 19/3406; G06F 19/34; G06F 19/3418; G06K 9/00671; G11B 27/309; G11B 27/10; A61B 8/46
See application file for complete search history.

(56) References Cited

U.S. PATENT DOCUMENTS

| | | | | |
|---|---|---|---|---|
| 6,330,281 B1* | 12/2001 | Mann | ...................... | H04N 19/61 375/240.12 |
| 6,593,925 B1* | 7/2003 | Hakura | ................... | G06T 13/20 345/426 |
| 6,625,223 B1* | 9/2003 | Wimmer | ................ | H04L 7/042 375/259 |
| 7,015,935 B2* | 3/2006 | Herget | .................. | A61B 5/055 345/649 |
| 7,167,519 B2* | 1/2007 | Comaniciu | ............ | H04N 19/23 375/240.08 |
| 8,116,373 B2* | 2/2012 | Base | ..................... | H04N 19/60 375/240.02 |
| 8,423,121 B2* | 4/2013 | Wang | ...................... | A61B 6/12 382/102 |
| 8,908,775 B1* | 12/2014 | Higa | ..................... | H04N 19/90 375/240.26 |
| 9,451,197 B1* | 9/2016 | Krause | ............... | H04N 21/4221 |
| 2004/0239699 A1* | 12/2004 | Uyttendaele | ...... | G06F 17/30056 715/716 |
| 2006/0031917 A1* | 2/2006 | Winder | ............. | H04N 13/0011 725/135 |
| 2007/0005795 A1* | 1/2007 | Gonzalez | .......... | G06F 17/30017 709/232 |
| 2008/0056586 A1* | 3/2008 | Cheng | ................ | H04N 19/527 382/232 |
| 2008/0059665 A1* | 3/2008 | Cheng | ................. | H04N 19/503 710/53 |
| 2009/0225076 A1* | 9/2009 | Vlietinck | .............. | G06T 15/005 345/419 |
| 2009/0295800 A1* | 12/2009 | Vetter | ..................... | G06T 15/08 345/424 |
| 2010/0254458 A1* | 10/2010 | Amon | .............. | H04N 21/23432 375/240.13 |
| 2010/0329358 A1* | 12/2010 | Zhang | ................. | H04N 19/597 375/240.26 |
| 2011/0064189 A1* | 3/2011 | Wang | ....................... | A61B 6/12 378/42 |
| 2011/0221865 A1* | 9/2011 | Hyndman | ............... | G06T 15/00 348/43 |
| 2011/0293011 A1* | 12/2011 | Tu | .......................... | H04N 19/51 375/240.16 |
| 2011/0304634 A1* | 12/2011 | Urbach | .................. | G06F 9/5016 345/501 |
| 2012/0059253 A1* | 3/2012 | Wang | ........................ | A61B 6/00 600/427 |
| 2012/0069904 A1* | 3/2012 | Amon | ..................... | H04N 7/16 375/240.13 |
| 2012/0188341 A1* | 7/2012 | Klein Gunnewiek | ....................... | H04N 13/0011 348/43 |
| 2012/0230558 A1* | 9/2012 | Chen | ..................... | G06T 7/0016 382/128 |
| 2012/0232384 A1* | 9/2012 | Wu | .......................... | G06K 9/64 600/434 |
| 2014/0132594 A1* | 5/2014 | Gharpure | ................ | G06T 15/205 345/419 |
| 2014/0289627 A1* | 9/2014 | Brockmann | ..... | H04N 21/23412 715/719 |
| 2014/0362086 A1* | 12/2014 | Brockmann | ........... | H04N 19/56 345/440 |
| 2014/0362930 A1* | 12/2014 | Brockmann | ......... | H04N 19/103 375/240.26 |
| 2016/0191893 A1* | 6/2016 | Gewickey | ........... | H04N 13/025 386/223 |
| 2016/0249068 A1* | 8/2016 | Baese | ................ | H03M 7/4006 |
| 2017/0250850 A1* | 8/2017 | Urbach | ............. | H04L 29/08108 |

OTHER PUBLICATIONS

Application for U.S. Appl. No. 14/719,469, filed May 22, 2015.

* cited by examiner

VIDEO-BASED INTERACTIVE VIEWING ALONG A PATH IN MEDICAL IMAGING

BACKGROUND

The present embodiments relate to medical imaging. In medical imaging, the interior of a patient is scanned. Various approaches are possible, such as magnetic resonance (MR), computed tomography (CT), x-ray, fluoroscopy, ultrasound, positron emission tomography (PET), or single photon emission computed tomography (SPECT). Three-dimensional (3D) visualization is a common practice to assess and record the internal conditions of patients. The scan data is used to render an image of the patient. Images simulating a "fly-through" or from different viewpoints within the volume may be generated. The user may interact with the rendering to alter the location of the viewpoint, direction of viewing from the viewpoint, and/or rendering parameters.

In terms of high-performance rendering from the volume of a large amount of data, interactive or real-time rendering may be difficult. Pre-rendering is used, allowing for high-quality rendering to be viewed. While traditional pre-rendered movies offer a high quality playback, it only allows a fixed playback sequence. High quality interactive viewing of large data or a complex scene is often prohibitive due to the intense computer computational power required.

Interactivity is usually performed in real-time rendering. However, photorealistic rendering of 3D/4D volumetric image scenes requires a large amount of computer processing power that is prohibitive for producing the high framerate required for interactivity on conventional computing devices. For use cases such as an endoscopic view, high quality is particularly required for every frame. Providing interactivity by sacrificing image quality is not desired.

BRIEF SUMMARY

By way of introduction, the preferred embodiments described below include methods, systems, instructions, and computer readable media for interactive viewing in medical imaging. Pre-rendering is used to provide greater quality of the rendered images with a given computational power. For interactivity in viewing direction, two or more views are rendered for each location and provided as video to the viewer. The viewer selects a viewing direction interactively, and an image at the selected view direction is formed from the previously rendered images of the videos for the two or more views.

In an alternative or additional approach, a video graph is created with videos of different segments of the graph. The videos are sequences of images representing change in location, camera parameters, and/or rendering settings. Once provided to the user, interactivity is provided by selection of the appropriate node of the video graph. The user may interactively select different locations and/or rendering settings available in the video graph, allowing interaction while benefiting from quality provided by pre-rendered video.

In a first aspect, a system is provided for interactive viewing in medical imaging. A rendering server is configured to render a sequence of images from data representing a volume. The sequence is from a viewpoint at different locations along a path through the volume where images from multiple different view directions from the viewpoint are provided for each of the locations. The rendering server is configured to transmit the sequence as a video. A client computer includes a network interface configured to receive the sequence of images as the video from the rendering server. The client computer is configured to receive a user selection of a view orientation from a user input device, generate a display image from the images of one of the locations based on the view orientation, and display the display image on a display of the client computer.

In a second aspect, a method is provided for interactive viewing in medical imaging. A client device receives, from a server, a video representing multiple images forming a view surrounding each of a plurality of positions along a path through a medical scan volume. User input on a user input of the client device of a view direction is obtained for at least a first one of the positions. Part of the view surrounding the first position is extracted from the multiple images and based on the view direction. An image is generated on a display of the client device from the extracted part.

In a third aspect, a non-transitory computer readable storage medium has stored therein data representing instructions executable by a programmed processor for interactive viewing in medical imaging. The storage medium includes instructions for generating a video graph having multiple segments, at least a first of the segments branching from a second of the segments, rendering images from medical scan data representing a volume, the rendering being for different nodes of the first and second segments of the video graph, and encoding the images of the first segment into a first video and the images of the second segment into a second video.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Figures 1, 2:
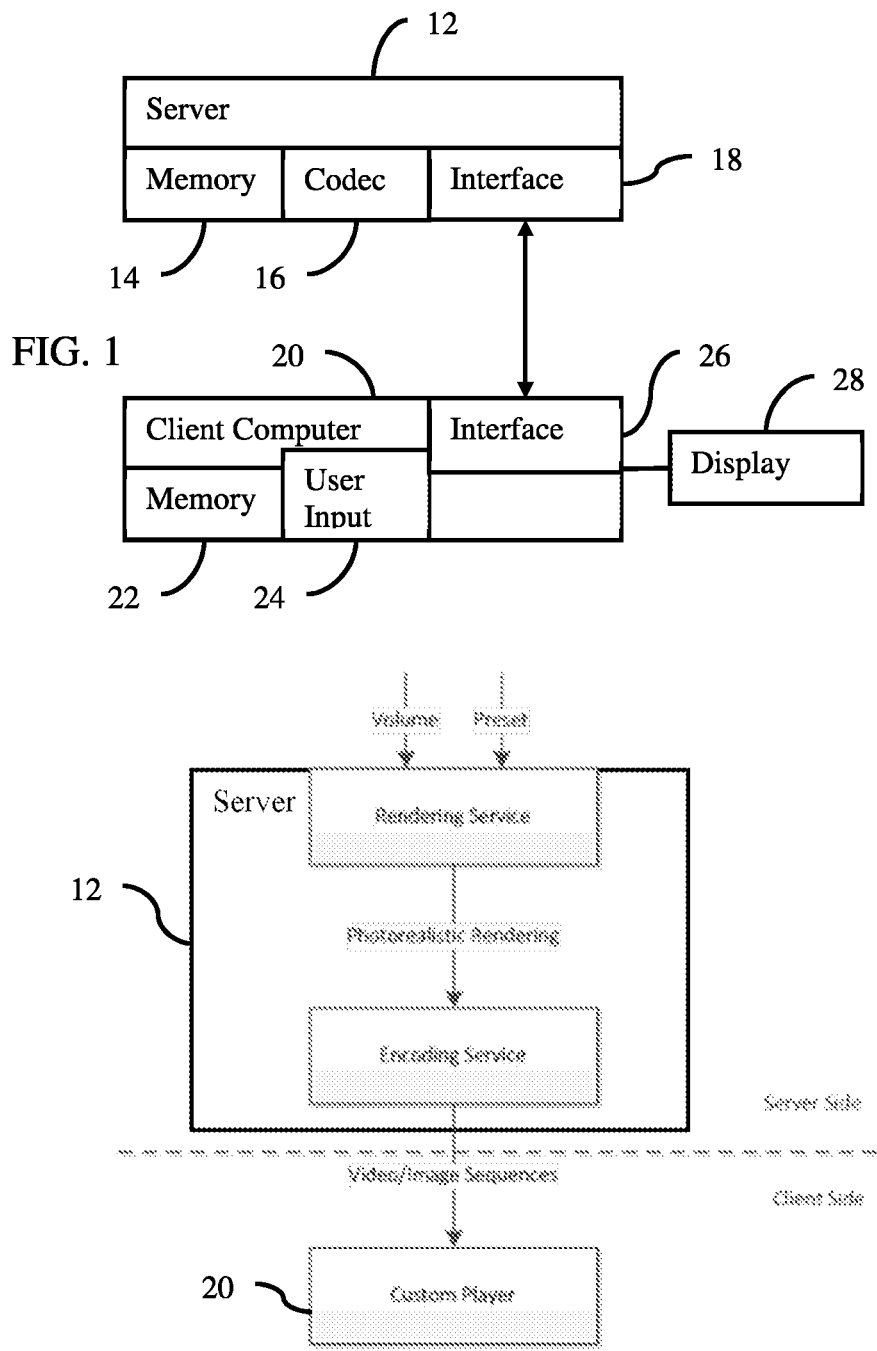
FIG. 1 is a block diagram of one embodiment of a system for interactive viewing in medical imaging.
FIG. 2 illustrates an example arrangement for the system of FIG. 1.

Video of images rendered along a spatial path are provided by pre-rendering, allowing for high quality images. High quality may be provided by using monte carlo path tracing or other processing intensive rendering. Some computers or user devices may not have sufficient processing power to render and re-render during interaction with the user without introducing 1 second delays or more in image presentation. An endoscopic, vascular centerline, or other path in a scan volume defines the viewpoints for rendering. A movie sequence for imaging while progressing along the path is pre-generated.

For interactive viewing from pre-rendered video, two general approaches are used separately or together. In a first approach, a whole, bubble (i.e., spherical), or surrounding view is captured for each viewpoint, such as capturing with two 180 degree (e.g., hemisphere) photorealistic fisheye renderings or six cube map renderings at selected camera positions. These two or more renderings are then combined and encoded in to a custom video or are encoded as separate videos. The video or videos are streamed to a local or remote machine where the video may be played by a movie player. For continuous navigation, only one view is displayed from each frame. When the user interacts by stopping the spatial progression to alter the view direction, an arbitrary view is generated using the two or more encoded renderings, which cover the whole 360 degree or surrounding view. The virtual camera is moved and rotated along the predefined path. Preset or rendering parameters may or may not be changed.

By the first approach providing video capturing a surrounding view, movies produced from high quality photorealistic rendering may be pre-generated, while still allowing for interactive change in the viewing direction along points on the path during the movie playback. Compared with a video having no interaction capability, the proposed approach may provide interactivity with photorealistic renderings for high fidelity visual examination.

In the second approach, interactivity is provided for placement along the path and/or change in rendering parameters. High quality rendered data in the form of video may be explored using a video graph. A set of pre-rendered high quality video segments connect through the video graph. Different video segments may be provided for different spatial branches, such as branches of a coronary tree of the heart or different organs of a patient. The user selects the location along the video graph, which relates the corresponding pre-rendered image or images to the location. By clicking on a point of interest on one of the branches of the graph or navigating through the views, the movie player jumps to the corresponding frame of the movie. Subsequently, the user may continue to navigate up and down the coronary branch in a simple to use bidirectional movie playback. Using this technique, exploration of the various coronary branches in any arbitrary order is possible without requiring real-time rendering. Similarly, the video graph may include branches that relate to changes in rendering parameters instead or in addition to spatial locations. The user alters the rendering parameters interactively by selecting parts of the video graph having the different rendering parameters. For example, a body organ of interest is rendered with different organ specific parameters. The user may select the rendering settings for rendering the organ.

The video graph provides the ability to smoothly transition between segments, whether segments for spatial locations or segments for rendering parameters. High quality pre-rendered data exploration using video may avoid the need of costly servers or intensive computation power at runtime for real-time interactivity. The video graph data structure and its associated software enable any computing device capable of video playback to experience a photorealistic, interactive three-dimensional (3D) medical data exploration. By shifting from heavy GPU processing requirements to one of simple video playback, the 'barrier-to-entry' for experiencing photorealistic rendering with interaction is greatly reduced, allowing use on smartphones or other devices with limited image processing. The video graph may be expanded by adding segments.

FIG. 1 shows one embodiment of a system for interactive viewing in medical imaging. The system is provided in a client-server arrangement. FIG. 2 shows a server 12 receiving rendering parameters (preset) and the volume data from a medical scan. The server 12 pre-renders images that are encoded into a video stream. To allow for interaction by the client device 20 provided as a custom video player, the encoded images are rendered to represent a surrounding view for each location along a path. As the user at the client alters the view direction interactively, the parts of the already provided video images for the selected view direction are extracted and displayed to the user. The result is the user being able to interactively alter the view direction for one or more locations without requiring re-rendering.

In other embodiments, the system is a workstation or medical imaging system. A client-server arrangement is not provided. The sequence of rendered images are pre-rendered and encoded as video or not. The pre-rendered sequence includes the surrounding view, allowing view direction interaction without rendering from the volume during playback on the workstation or medical imaging system.

Figure 8:
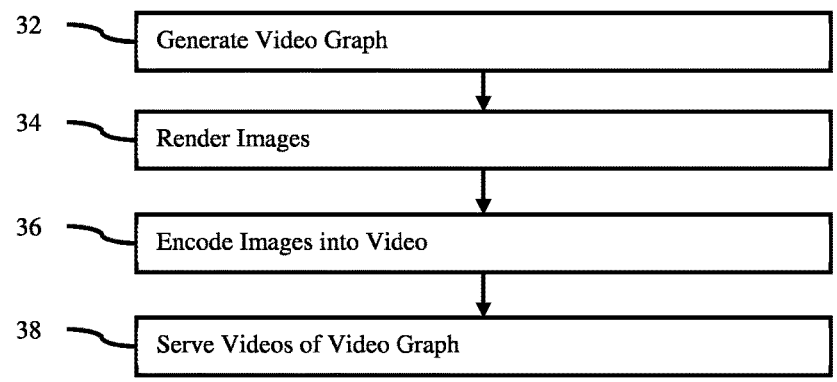
FIG. 8 is a flow chart diagram of one embodiment of a method for interactive viewing in medical imaging.
Figure 15:
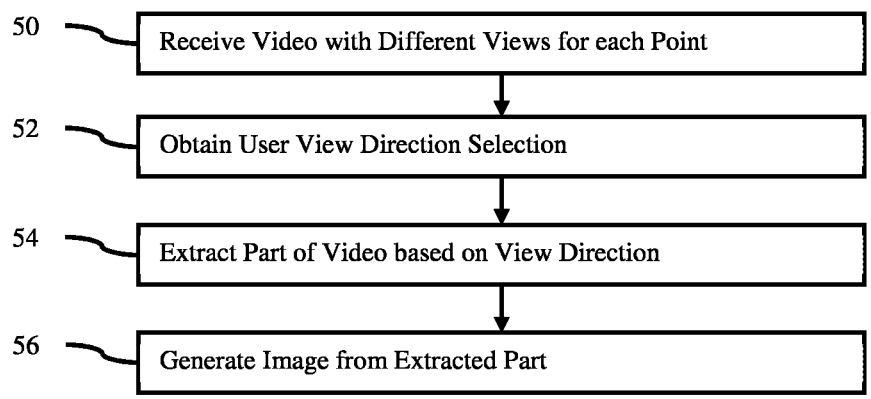
FIG. 15 is a flow chart diagram of one embodiment of a method for interactive viewing in medical imaging.

The system is configured to implement the method of FIG. 8, the method of FIG. 15, both methods (FIGS. 8 and 15) or other methods. In the example below, the client computer implements the method of FIG. 15 and the server implements a method for generating the video used by the client computer. The methods related to FIG. 15 provide for client-side interaction of viewing direction using pre-rendered video. In alternative or additional embodiments, the server 12 implements the method of FIG. 8 and the client computer implements a method for position and/or render parameter variation using a video graph.

The system includes the server 12, client computer 20, and display 28. Additional, different, or fewer components may be provided, such as other client computers also being provided for receiving the video.

As represented in FIG. 2, the user causes the sever 12 to obtain (e.g., via upload, download, query from memory, or network transfer) a volume or dataset. The voxel data is obtained from a memory and/or from a medical scan.

The medical scan data is acquired using any medical imaging system. For example, the medical imaging system is a CT, MR, ultrasound, x-ray, fluoroscopy, or emission tomography (i.e., functional imaging such as PET or SPECT) system. The medical imaging system is any now known or later developed medical imaging system for scanning an interior of the patient. The medical imaging system is configured to scan an internal region of the patient. Any portion or extent of the patient may be scanned, such as a scan of an organ, torso, extremity, or full body. The scan acquires data representing the interior of the patient. The represented portion includes a volume or three-dimensional distribution of response from the patient.

The medical imaging system is configured to scan the patient to acquire at least one set of data. The set or frame of data represents the internal region of the patient at a specific time or period. A static volume is acquired. Alternatively, the scanning is repeated or performed in an ongoing manner to acquire a sequence of sets of voxel data. Each set represents the volume at a given time or period, so the sequence represents the volume over time (3D+t or 4D data). Any frame or volume rate may be provided.

The scan data may be provided to the server 12 as a 3D reconstruction or data representing a volume. The data from the scan is formatted as voxels in an isotropic grid. For example, voxels in a 512×512×512 Cartesian grid are used. Anisotropic grids may be used. Other formats may be used, such as the data representing locations in a polar coordinate format. For each voxel or location, a scan response is provided by a scalar value (e.g., 16 bit dynamic range), but other representations may be used, such as RGB values.

The server 12 also receives the preset. The preset is a collection of any number of rendering parameters. The values for the window/level (e.g., range of scalar values of interest), transfer function, illumination model, color maps, camera field-of-view, or other rendering settings are acquired by the server 12. The acquisition is by user input, user alteration, and/or loading from memory. The preset is appropriate for the given volume of scan data. Different types of medical imaging may use different presets. After any modification of the preset by the client computer 20, the server 12 is configured to generate a video or movie from the volume using the preset.

The server 12 includes a memory 14, codec 16, and interface 18. Additional, different, or fewer components may be provided. For example, the server includes a user input. In one embodiment, the server 12 includes one or more graphics processing units for rendering.

The server 12 is configured by software, firmware, and/or hardware to render a sequence of images from the data representing the volume. In one embodiment, the memory 14 stores the medical scan data, presets, and/or the instructions for the server 12 to perform rendering.

The memory 14 is a graphics processing memory, video random access memory, random access memory, system memory, cache memory, hard drive, optical media, magnetic media, flash drive, buffer, database, combinations thereof, or other now known or later developed memory device for storing the set or sets of voxel data or other data.

The memory 14 or other memory is a computer readable storage medium storing data representing instructions executable by the programmed server 12 for visualizing in medical imaging. The instructions for implementing the processes, methods, and/or techniques discussed herein are provided on computer-readable storage media or memories, such as a cache, buffer, RAM, removable media, hard drive, or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The server 12 is configured to render a sequence of images from data representing the patient volume. As part of a rendering service, the server 12 generates photorealistic renderings based on the user-selected preset. Photorealistic renderings or other renderings are generated based on a selected preset appropriate to the data use case.

For rendering, the server 12 is a general processor, central processing unit, control processor, graphics processor, graphics processing unit, digital signal processor, three-dimensional rendering processor, image processor, application specific integrated circuit (ASIC), field programmable gate array (FPGA), digital circuit, analog circuit, combinations thereof, or other now known or later developed device for rendering an image from data. The server 12 is a single device or multiple devices operating in serial, parallel, or separately.

The server 12 is configured to generate an image from the volume data. The image is a single representation of the patient volume from a viewpoint and view direction. Projection or surface rendering may be used. For projection rendering, the server 12 cast rays through the volume. A ray is cast for each pixel of the image. Multiple rays may be cast for a single pixel, such as in a single iteration of a render loop. Using the transfer function for data limited by the window, the pixel value for each ray is determined from the volume. Illumination or shading may be added.

Figure 3:
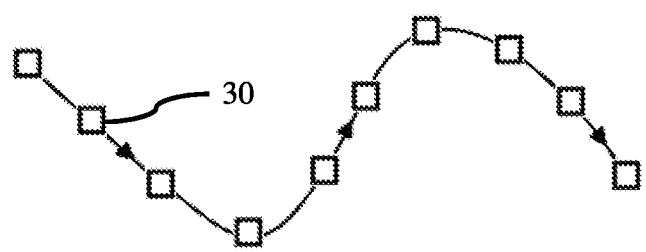
FIG. 3 shows an example path with nodes.

The sever 12 is configured to generate a sequence of images to display as a movie. The sequence is for images along a path. FIG. 3 shows an example path with nodes 30. Each node represents a different spatial position in the volume. A node may exist outside of the volume, such as for a zoomed out view. An image is rendered for each node 30 of the path with the viewpoint being at the respective node 30. By placing the generated images in order, the sequence represents moving along the path, such as represented by the arrows in FIG. 3. The point of view for rendering progresses along different locations of the path through the volume. A rendering engine of the server 12 generates high quality photorealistic or other images for a given set of rendering parameters along a pre-generated 3D examination path. For a set of connected render paths, high quality rendered frames are generated for each point in time along each render path. By providing the rendering off-line or not in real time with viewing the images, the rendering path may implement higher quality images than given the same capabilities in a real-time or more time limited rendering environment.

Any path may be used. For example, the path is along a vessel or other structure centerline. In other embodiments, the path is along a surface of an organ, through the patient in an arbitrary path, or is disjointed where each node 30 is for a different organ, part, or structure. The path is provided as part of the preset, provided with or as part of the data set for the volume, is created by the user, or is created by the server 12.

Figure 4:
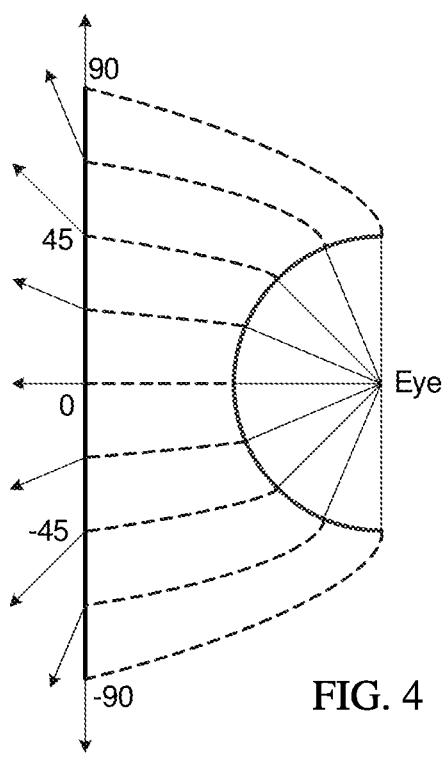
FIG. 4 is an example fisheye rendering format.

For interactive viewing of the rendered images, a surrounding view is rendered for each node 12. Rather than providing one field limited rendering (e.g., forward looking camera), one or more images are rendered to provide a broader field of view. For example, the rendered image may be of the surrounding view, such as a spherical or cylindrical camera geometry. Alternatively, two or more images are rendered for each node 30 (i.e., each spatial location along the path). Each of the multiple images for a given location is rendered from different view directions. For example, two fisheye views of opposite hemispheres around each location are rendered. The server 12 uses the predefined path and a 180 degree fisheye camera to generate photorealistic renderings. An angular fisheye projection is defined so that the distance from the center of the image is proportional to the angle from the camera view direction as shown in FIG. 4. FIG. 4 shows an example of ray casting for a fisheye view with a hemispherical or 180 degree field of view. In an angular fisheye rendering, the resolution is approximately equal across the whole image, so that the distortion is minimized at the boundary area between images. Other ranges may be used, such as dividing the surrounding volume into three or more fields of view.

In alternative embodiments, any now known or later developed ray casting for projection rendering may be used to render images from different directions. The rays are cast as part of a camera or lens model. Parallel or perspective projections may be used for a projection to a planar surface. The rays are cast as parallel from pixel locations or diverging with an origin at a virtual viewer of the volume. The viewer may be positioned outside or inside the volume. More complex non-linear projections may be used, such as to model a medical scope (e.g., endoscope or fiber optic viewer). For example, non-linear projections include rays cast to model a fisheye, spherical, or cylindrical lens. The rays are cast with different geometry than parallel or diverging from a single point.

In another embodiment, six images are generated for six different view directions for each location on the path. The six images make up a cube map of the volume. For each side of the cube, any ray casting or camera geometry may be used. For example, six fisheye or other renderings represent each side of the cube map.

Two or more renderings are generated at each selected camera position. Each image looks in a different direction. For example, one hemisphere fisheye view looks forward along the path and another hemisphere fisheye view looks backward. The outputs of the rendering are two or more high quality rendered images at each selected camera position along the path.

In alternative embodiments, the server 12 renders images for more than one view direction for just a subset of locations on the path. For other locations, images only for the forward or other default view direction are provided.

In total, the rendered images represent the view of a sphere, cube, or other structure completely surrounding the position. In other embodiments, the images rendered with different view directions cover less than completely around the position. There is some range of angles in three-dimensions or a patch or patches for which an image is not rendered. The multiple images cover different parts of the surrounding view but less than all. The multiple images may overlap, representing the same location or view in two or more images, but cover different fields of view. In other embodiments, each field of view of the different view directions are exclusive or without overlap.

In another embodiment, additional images are rendered for each location. For example, each node has two offset viewpoints for stereoscopic viewing. The server 12 renders multiple view directions from each of two viewpoints for a given node 30 or location. Images are rendered at each position for offset viewpoints to produce stereoscopic image pairs. While the range of view directions available to the user for interactively selecting different view directions in stereo may be limited, stereo viewing is provided. In the two hemisphere images for each location, rendering for stereo view may result in four images for each location. Alternatively, the offset locations for stereoscopic rendering may be rotated relative to each other to provide stereo viewing over a greater range of view directions, but with the result of additional images being generated.

For progression along the path, the server 12 generates two or more sets of images. Each set is of images from different locations along the path from a same view direction (e.g., forward hemisphere for one set and backward hemisphere for another set). Two or more views are generated for each selected camera position.

Different approaches may be used for converting the sets into video. The preset may include a setting indicating the way to convert into video, a default may be used, or the client computer may indicate the way.

In one embodiment, the images for each location are combined into the same frame for video encoding. The two sets are formed into a single stream or sequence. In the single stream architecture, each image sent to the encoder is the result of stitching the two fisheye or other rendered images side by side in a horizontal and/or vertical fashion. In this way, both forward and reverse fisheye renderings are available at each frame. The resulting video includes both images as a single image.

Figure 5:
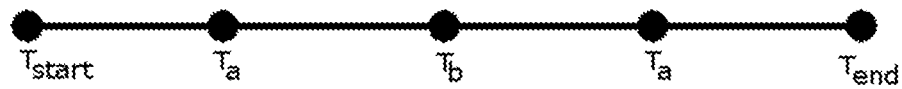
FIG. 5 shows a video stream of combined viewing directions according to one embodiment.

Data padding may be provided to separate the stitched together images. For some use cases, only the forward facing fisheye is required for some of the locations, so the other half of the image to encode is filled with empty data. FIG. 5 shows an example of a sequence of frames from $T_{start}$ to $T_{end}$ where $T_a$ is only a forward looking fisheye rendering and $T_b$ is a frame with both forward and reverse fisheye rendering available. $T_b$ may be provided for all the locations or times in other embodiments.

Figure 6:
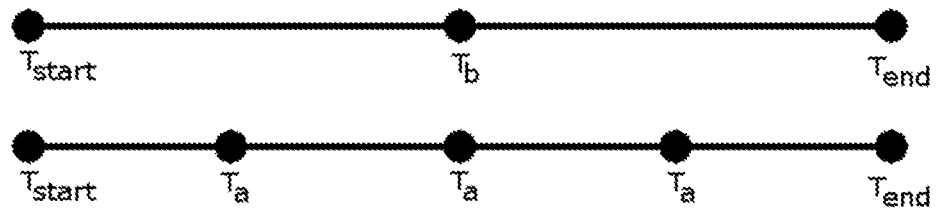
FIG. 6 shows two video streams for different viewing directions according to an embodiment.

In another embodiment, the two or more sets are provided separately for encoding into video. For a given path, two or more timelines (i.e., one for each view direction per location) are used to encode the rendering results. For example, one timeline is provided for the forward fisheye rendering and the other timeline for the reverse fisheye rendering.

Where the backward view direction set or any of the sets do not include images for one or more locations, a filler or blank image is provided for that time. FIG. 6 shows an example where Ta is for the forward view and Tb is for the backward view. For the timeline on top, each point in time is the encoded image for the backwards facing fisheye rendering. For the timeline on the bottom, each point in time is the encoded image for the forwards facing fisheye. For a given point in time, if there exists overlapping $T_a$ and $T_b$ from the two timelines, the user is able to pause time and interactively view the 3D scene reconstructed from the two fisheye renderings. The dual stream architecture has the ability to have less total output size since the frequency of forward and backwards rendering may be different for some use cases.

Figure 7:
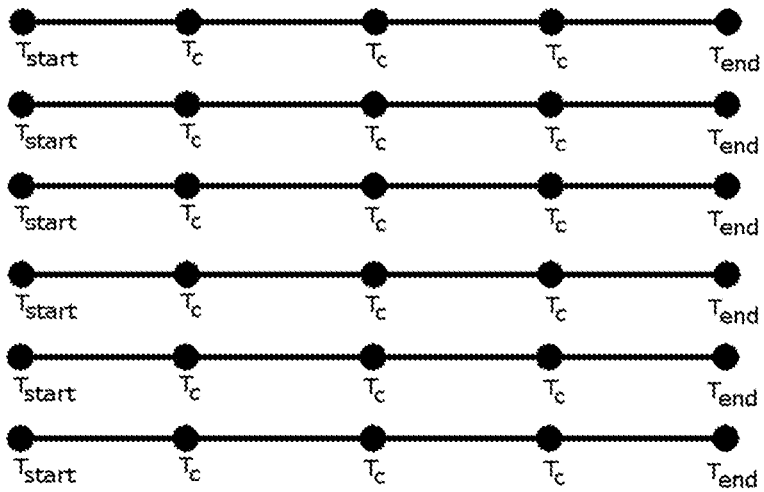
FIG. 7 shows six video streams for a cube map of viewing directions.

In another embodiment, six timelines are constructed as six sets in cube map steams. FIG. 7 shows an example where six timelines are provided for the six sides or faces of the cube map. $T_c$ is an image for a given side. Any number of image sets may be provided.

The codec 16 of the server 12 receives the set or sets of images. The codec 16 is an application specific integrated circuit, field programmable gate array, general processor, or other circuit for converting a sequence of images into a video. The codec 16 may be separate hardware or may share hardware, such as being part of the general processor of the server 12. The codec 16 implements H264, MPEG, or other video compression for generating a movie of images over time. Since the different images are a sequence representing views from a progression of locations along a path, the encoded video shows a movie or video stream of images moving along the path over time.

The codec 16 encodes the rendered image frames into a video stream together with any corresponding metadata parameters. For interacting with the video by a movie viewer, the video stream is provided with the metadata. The metadata may indicate the type of video encoding so that the proper decoding is performed. The metadata may include path data, such as a graphical representation of the path or other path information. The metadata may include camera parameters, such as, the location of different fields of view, or other information used to extract a user selected field of view from the provided video or videos. Other information may include the number of video streams.

A separate video stream or movie is encoded for each of the sets. Where one set with images combined into common frames is provided, the camera data indicates the relative locations of the different images stitched together. Where multiple (e.g., two, six or other number) sets are provided for separate encoding, a corresponding number of video streams are encoded. The camera metadata indicates the view direction and/or field of view for each of the video streams.

The interface 18 is a wireless or wired network interface. Alternatively, the interface 18 is a bus or direct connection interface, such as a universal serial bus (USB). The interface 18 is a separate card but may be a port of a processor of the server 12. The interface 18 provides for communications with the client computer 20.

The interface 18 is used by the server 12 to transmit the sequence or sequences of images to the client computer 20. The sequence or sequences are transmitted as encoded, so are transmitted as video.

In one embodiment, multiple sequences are provided for different segments of a spatial and/or preset graph. A video graph is used as discussed for FIG. 8. The video graph and corresponding videos are transmitted so that the user of the client computer 20 may interactively navigate along the spatial path or paths and/or through different settings or values of the rendering parameters for a given location in the path. Different videos are provided for different segments of the video graph, such as the spatial path or a change in rendering.

Where a sequence of videos or more than one video is provided, the videos are transmitted separately, multiplexed, or are concatenated into one video stream for transmission.

The client computer 20 receives the video or videos. The client computer 20 is a tablet, laptop, smart phone, personal computer, workstation, or medical imaging system. The client computer 20 includes a processor, application specific integrated circuit, field programmable gate array, circuitry, combinations thereof, or other hardware for viewing the videos interactively.

The client computer includes the memory 22, user input 24, and interface 26. Additional, different, or fewer components may be provided. For example, the display 28 is part of the client computer 20. As another example, the user input 24 is a touch screen of the display 28.

The interface 26 is a wireless or wired network interface. Alternatively, the interface 26 is a bus or direct connection interface, such as a universal serial bus (USB). The interface 26 is a separate card but may be a port of a processor of the client computer 20. The interface 26 provides for communications with the server 12. The video or videos from the server 12 are received by the interface 26.

The received videos are sent to the memory 22 or a buffer. The memory 22 is any of the memories discussed above for the memory 14. The memory 22 is a same or different type of memory than the memory 14. The received videos, metadata, user input information, or other data is stored on the memory 22. The memory 22 is alternatively or additionally a non-transitory computer readable storage memory for storing instructions that may be executed by the client computer to provide interactive viewing of the video.

The client computer 20 includes a movie player implemented as software, hardware, and/or firmware. The movie player plays back the encoded video stream. The movie player runs in a browser, on the mobile device as an application or program, and/or as a standalone desktop application or program. The movie player decodes the video stream or streams. The video is unpacked from the compressed format. For each location or corresponding time in the sequence of images of the video, the decoded images are transferred to a graphical display pipeline for interaction by the user.

The movie player may receive input from the user input 24 to stop and look around any selected camera viewpoint in the movie. Based on user interaction with the video during display of the video and/or user interaction with a graphic of the path, the user may select one or more points or times for further viewing. The user may select to view the volume from a different orientation.

The user input 24 is a keyboard, button, slider, knob, track pad, mouse, touch sensor, or other sensor. The user input 24 is configured to receive input from the user. The input may configure the images for viewing, such using a slider or click-and-drag operation to rotate a view. By selecting a time, path location, or image, the user indicates with the user input 24 a node 30 for which other view directions are desired. The user input 24 is then used to indicate the desired view direction through rotation or direct entry of an angle. The change in view direction is then applied to the image for the node or applied to images of multiple nodes or spatial locations/times.

For example, a default camera is positioned in the forward position along the path. As the playback commences, the camera is moved along the path with the corresponding playback of the forward image frames. The user pauses the video and uses the user input 24 to change the camera position at the selected location. Other user interaction may be provided, such as the user entering a view direction other than the default before, during, or after presentation of the video showing the image along the path. The video is then repeated but with the different view direction.

Since the video or videos provide different view directions for some or all of the locations along the path, different view directions are available to the user for viewing for some or all of the locations. Rather than re-rendering with the different view direction, the high quality pre-rendered image information is used to provide the images from the desired or available view directions. The pre-rendered video is used for the interaction.

For example with the forward and backward fisheye views or cube maps, the camera for the selected view direction is computed. The client computer 20 is configured to re-project the image for the corresponding or selected view direction from the fish eye or cube map views. Since the video with the images are generated is high quality, the high quality rendering is maintained.

Using the video or videos, images from the different view directions are available. The view direction most similar or closest to the user selected view direction is then displayed. Alternatively, to generate the display image for a user selected view direction, the client computer 20 extracts parts of the different images of the different sets of pre-rendered images. For a given location, a surrounding view is provided as two or more images. Given a user or interactively selected view direction, a field of view is defined. This field of view is used to select the parts of the images within the field of view. An image for the field of view is constructed by the client computer 20 and presented to the user. Different parts of the different images for that location along the path are combined, such as by stitching based on spatial location represented. The resulting image is played back as part of the video or presented on the display 28.

For example with a fisheye encoded playback, either single or two stream encoding is provided. The forward and backward views are transferred on the display pipeline for display and interaction. Based on interaction, a field of view that includes only portions of each hemisphere may result. The client computer 20 extracts the portions from the video images and combines them to form an image along the user selected view direction.

The extraction may be performed form the images of other locations along the path to view the movie from the user selected direction. For example with a cube map encoded playback, the user interacts to indicate a view direction. As the user is viewing the movie with a selected view direction, a visibility test is performed on the cube map to determine which faces of the cube map are needed to reconstruct the user selected view. The encoded video frames are extracted at the current position in time from the corresponding movies of the visible faces. The extraction is repeated for other times.

Interaction with the transmission of the videos may be provided. The user selected view direction is transmitted to the server 12, so that the images for the visible faces along the path direction are streamed to the client computer 20 first, followed or not by the videos for the rest of the faces. Optionally, the video faces may be cached in encoded or decoded format on the client.

The display 28 is a CRT, LCD, LED, projector, plasma, printer, or other display device. The display 28 displays images provided in a display buffer. The video images and/or created images extracted from different views are displayed on the display 28. A graphic representation of the path for allowing the user to select times or path locations may be provided on the display 28. Other graphics for interaction, such as icons to rotate or otherwise select a view direction, are alternatively or additionally displayed.

FIG. 8 shows one embodiment of a method for interactive viewing of medical images. To provide for different or additional interaction with pre-rendered video, a video graph is generated. The video graph represents different spatial locations and/or different presets or settings of rendering parameters. Multiple segments are provided in the graph, allowing the user to navigate to different spatial locations and/or different presets for one or more of the spatial locations. The video graph defines a set of render paths to be rendered. Each render path generates a video segment. Consumer or other video codecs are used to encode each video segment. The video segments are associated with nodes in the video graph. As the user traverses the graph, the relevant encoded frames are sent to the user for decoding or are decoded for the user if already available.

The data that is output from the video codecs is arranged in order to facilitate user navigation through time or presets in a bidirectional manner. This video graph (a graph of video segments) allows any computing device powerful enough to play a movie to realize an interactive, photorealistic, medical data exploration at high resolutions or resolution not provided if the computing device were rendering from the volume.

The method is implemented by the system of FIG. 1 or another system. For example, acts 32 and 34 are performed by the server 12, act 36 is performed by the codec 16, and act 38 is performed by the interface 26. Any one or more of the acts may be performed by different devices.

The acts are performed in the order shown or other orders. For example, acts 32 and 34 are performed in the order shown, a reverse order, or simultaneously.

Additional, different, or fewer acts may be provided. For example, acts implemented on the client device are provided, such as acts for selecting a spatial or preset node on the video graph or other acts for indicating the time (e.g., spatial location) and/or preset to be used for imaging.

In act 32, the server or processor generates a video graph. The video graph is created from a spatial path or collection of regions of interest (nodes 30). For example, a collection of organs is provided through segmentation. As another example, a centerline of a vessel tree or intestinal path is provided through manual entry or automated image processing. The spatial path is sampled or divided into steps to create nodes 30 for generating the video graph. Any step size may be used. Alternatively, the video graph is obtained from memory.

Figure 9:
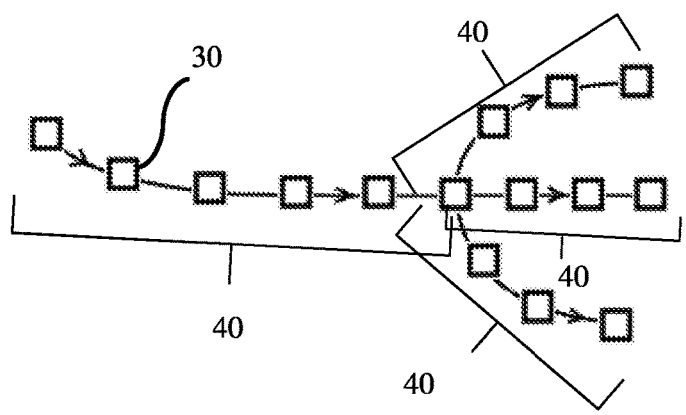
FIG. 9 shows an example video graph with spatially distributed nodes.
Figure 10:
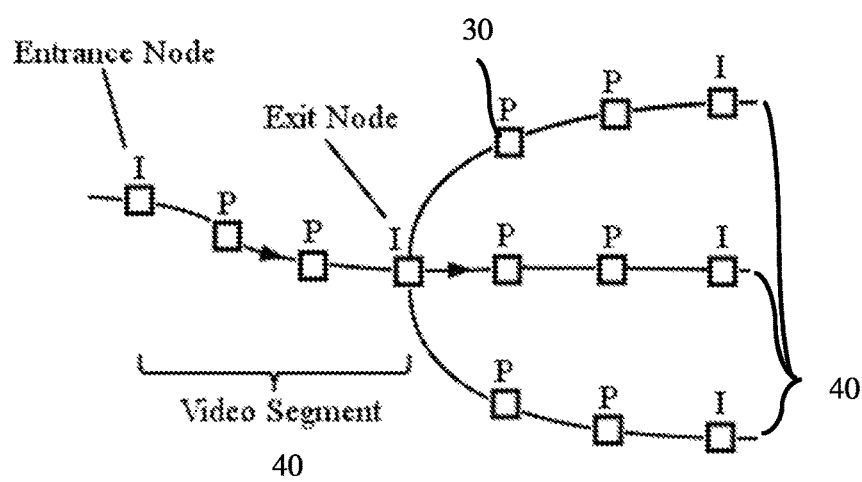
FIG. 10 shows segmentation of the video graph of FIG. 9.

The video graph includes multiple segments 40, 42. For spatial distribution of nodes 30 along the path, any branches are assigned as separate segments 40. For a single line in the path, one segment 40 is provided. Alternatively, a single line may be divided into portions to form different segments 40, such as shown in FIGS. 9 and 10 where the center branch is treated as a separate segment 40 while being a continuous line from the main branch. The different spatial parts (e.g., branches) are assigned as different segments 40. Each segment 40 has any number of nodes 30. The first node 30 in the segment 40 is an entrance node and the last node 30 in the segment 40 is an exit node. By stitching together multiple render paths, a graph structure is formed.

The edges of the video graph have no weight, and every edge is bidirectional. FIGS. 9-13 show example video graphs with nodes 30 where different spatial branches are assigned as different segments 40 of the graph. Arrows are used in the FIGS. 9-13 to indicate the forward direction of time as it pertains to the video encoder/decoder and not to show graph edge direction. Each segment 40 is a render path along which a sequence of renderings (rendered images) is created. In act 34, a single rendering or multiple renderings with multiple view directions are created for each node 30. In act 36, by encoding the sequence of images, a video is created of each segment 40, 42.

Figure 12:
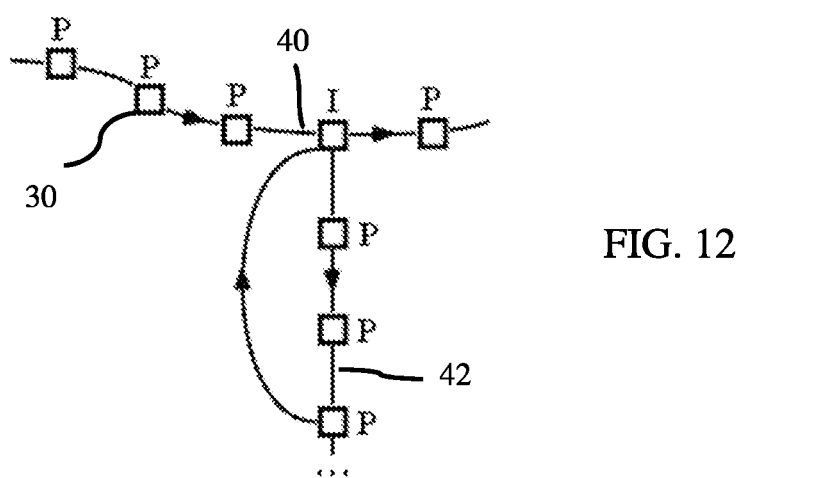
FIGS. 12 and 13 shows example video graphs with segments for different rendering parameters.
Figure 13:
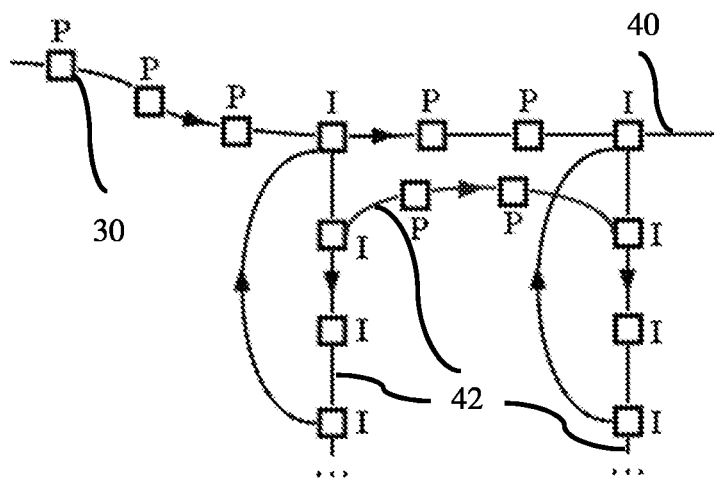

For act 32, other types of segments 42 may be provided for the video graph, such as shown in FIGS. 12 and 13. A segment 42 representing a change in rendering parameters for a location of the spatial path may be provided. A common use-case of interactive viewing is the ability to modulate rendering parameters in real-time, such as altering windowing, changing transfer function, pan/zooming, clipping, and so on. Since the video graph is used for a pre-rendered experience, special considerations are adopted in order to address 'real-time' or interactive rendering parameter changes where the video is previously created. Segments 42 representing changes in the preset may be added as the special consideration. For example, a sequence of images representing a change in transfer function for a given spatial location is created as a preset segment 42. Different nodes 30 along the preset segment 42 correspond to different values or selections of the transfer function. The same view from the same viewpoint is rendered with the differences in the transfer function for the different nodes 30.

Any combination of changes of one or more rendering parameters may be used in a given preset segment 42. Multiple segments 42 may be added to a given spatial node 30, such as segments 42 for changing different rendering parameters or groups of parameters. Each node 30 of the preset segment 42 represents a different value or values of one or more rendering parameters. Any change amount of any of the rendering parameters may be included in a preset segment 42. Any number of changes and corresponding nodes 30 may be included.

The video graph may include preset segments 42 connecting other preset segments 42, such as a shown in FIG. 13. Any combination of preset segments 42 and/or spatial segments 40 may be provided. Any division of a path through or outside the volume or collection of regions in or outside a volume may be used to create spatial segments 40. Any number and type of preset changes for preset segments 42 may be used. Preset segments 42 may be provided for only some or all of the nodes 30 of the spatial segments 40.

Other limitations may or may not be provided for generating the video graph. For example, the video graph only supports a change in rendering parameters (i.e., a preset segment) for any video segment 40 that is not divergent (branching) at its exit node. This restriction is due to the rendering parameters of the divergent branches potentially being different than what the user has selected in the current video segment 40. In the example of FIG. 10, the nodes 30 of the main segment 40 cannot include any preset segments 42. Alternatively, preset segments 42 are allowed, but the changed rendering parameters are discarded or reset before navigating out of the main branch and into a video for another branch in the video graph.

Other limitations are associated with the type of encoding to be provided. In one embodiment, the images of some nodes are to be encoded as intra-encoded frames (I-frames), and images of other nodes are to be encoded as predictive-encoded frames (P-frames). I-frames do not rely on other frames for compression. P-frames rely on preceding frames for compression. Other compression or frame formats may be used.

FIGS. 10-13 show assignment of I and P-frames to the nodes. Entry node and exit nodes are assigned as I-frames. Two P frames are provided between every I frame (see FIG. 10), but other numbers of intervening P-frames may be used (see FIGS. 11-13). No P-frames may be provided in other embodiments. Different segments 40, 42 may have different distributions or ratios of P and I-frames.

For spatial navigation, the user may select different spatial nodes 30. Since nodes for P-frames rely on an I-frame, selecting to jump to a P-frame node 30 may result in not having the I-frame or preceding P-frame in cache to view images from the P-frame. The corresponding I-frame and any intervening P-frames may be loaded to generate the image from the P-frame at the selected node 30. Alternatively, the user is restricted to selecting only nodes 30 for I-frames in spatial navigating. The I-frame nodes 30 are flagged or used as seek nodes allowing user selection.

Where P and I-frames are used, rendering parameters are only able to be modulated (i.e., added preset segment 42) if the node 30 is for an I-frame (a seek point in the video graph). If the user is currently viewing a P-frame, the client decoder automatically seeks to the nearest I-frame where the user will be able to adjust rendering parameters, assuming a preset segment 42 is provided.

The labeling of the nodes as I and P-frames may be treated differently for preset segments 42. The encoding of the relevant subgraph is different from an ordinary renderpath, so the resulting generation of the video graph by flagging nodes as P or I-frames may be limited. For a preset chain or segment 42 that is not connected to other preset segments 42 (see FIG. 12), the encoding of the preset segment frames is similar to a standard renderpath. The encoding is an I-frame followed by subsequent P-frames with or without an ending node as an I-frame or intervening I-frames. Traversing the preset segment 42 is different from other navigations within the video graph. While viewing any P-frame along the preset segment 42, it is possible for the user to immediately seek back to the entrance node (I-frame) of the preset segment 42 (see FIG. 12). Simple blending is performed between the users' current frame in the preset segment 42 and the I-frame entrance node. Any blending may be used, such as interpolation between the two images with any step size or number of transitions. Since P-frames are directional (predicted from other frames along a direction in the timeline of the video), the intervening P-frames may not be used. Alternatively, the image jumps from the image for the P-frame to the image for the I-frame. The nodes 30 may be assigned to be I or P-frames along the preset segment 42.

For a preset segment 42 that is connected to another preset segment (see FIG. 13 with two preset segments 42 connected by another preset segment 42), the frames of each preset segment 42 are encoded as I-frames, and the frames connecting the two preset segment frames are encoded as P-frames and/or I-frames. At any I-frame in either of the two connected preset segments 42, the user may revert to the I-frame entrance node of the respective preset segment 42. If the user decides to suddenly exit the preset segment 42, blending between the user's current frame and the entrance node I-frame is performed. The video segment 42 created between two preset segments 42 behaves like any other video segment (e.g., supports forward and reverse time traversal).

Other limitations in generating the video graph may be provided. The limitations may relate to the type of encoding to be used, the type of rendering, or other considerations.

In act 34 of FIG. 8, a graphic processor, server, or other processor renders images for the segments 40, 42. Images are rendered for the various nodes 30. By providing one or more images for each node 30, the images may be placed in sequence to provide a video for a segment. For spatial nodes 30, the image sequence represents spatially progressing along the path. For preset nodes 30, the image sequence represents transition in the value or values of one or more rendering parameters.

For each node 30, one or more images are rendered. In one embodiment, only one image from a given view direction is rendered for each, all, or some of the nodes 30. In another embodiment, images from different viewing directions are rendered for each node to allow user interaction for view direction with the pre-rendered video. For example, two fisheye images from opposite directions (e.g., different hemispheres) at a location are rendered for each node 30.

In act 36, a video codec encodes the images. The images of each segment are encoded into a video. Different videos or movies are created from the sequences of the different segments.

Any encoding may be used. In one embodiment, H264 encoding is used. For example, the images of some of the nodes 30 are encoded as I-frames and the image of others of the nodes 30 are encoded as P-frames. The flags or labeling of the video graph indicate which images to encode as which type of frame. Alternatively, the video codec determines the type of frame to use.

For cube map, fisheye, and stereo rendering outputs, the different viewpoint renderings are packed together into an atlas before encoding. Alternatively, the different viewpoint renderings are encoded separately as different videos for a same segment 40, 42.

As the storage requirements for raw rendered frames are high, the raw data is processed using the video encoder in order to exploit data redundancy between frames and to keep the storage size small. For the encoding of individual points (frames) in time along a render path, the video encoder supports I-frames and P-frames.

Figure 11:
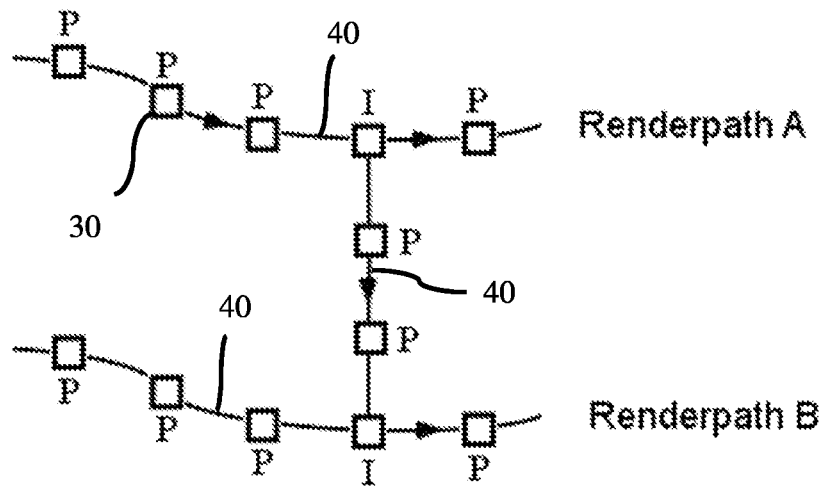
FIG. 11 shows another example video graph with three segments.

FIG. 11 shows encoding a segment 40 connecting from one segment 40 to another segment 40. This connecting segment is encoded as having start and end nodes 30 that are I-frames and intervening nodes that are P-frames. Intervening I-frames may be provided. By using start and end nodes 30 as I-frames, the same I-frame may be shared or used by different segments 40. This may reduce caching, storage, and/or processing.

Supporting these two types of frame encoding has implications when decoding in each direction along the time axis of a given movie segment. Because of the temporal dependencies inherent in P-frames, decoding when traveling in the opposite direction of the encoded ordering of frames is complex. If the client tries to seek to a previous P-frame that was decoded, that P-frame may not necessarily be used as is for that P-frame may reference data that is no longer cached in the decoder. These types of temporal dependencies create complexities in the decoding process.

Figure 14:
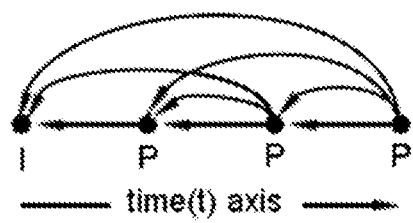
FIG. 14 illustrates temporal dependencies (frames referencing data in previous frames in a video timeline) for types of encoded images according to one embodiment.

FIG. 14 shows that p-frames may reference data in other frames previously encountered in the video segment timeline. By jumping to an I-frame instead of another P-frame, an image may be more easily decoded. The video encoder takes in raw frames as its input and produces encoded output on a frame-by-frame basis. The ability of a P-frame to reference older frames is modulated by the group-of-picture setting in the video encoder. For example, a group-of-picture value of 3 means there are two P-frames for each I-frame. By adjusting the group-of-picture setting of the encoder, more (or less) I-frames will be generated by the encoder, and these I-frames are used as seek (navigation) points in the video stream.

The encoding may provide for bi-directional operation, allowing further navigation. Separate video streams are created for a same segment where each video progresses along the nodes of the segment in opposite directions. A movie segment is a collection of frames that are encoded along a given renderpath of the total graph data structure. The beginning frame of every video segment is encoded as an I-frame and subsequent frames of the same movie segment are encoded as P-frames and/or I-frames. The I-frames serve as random seek points for fast graph traversal, and the P-frames help to keep the total data size low. Different video segments can use different group-of-picture settings, but the group-of-picture cannot change in the middle of a video segment. To allow a user to move forward and backwards in time, a video segment contains encoded frames for both directions in time along its renderpath. There are two discrete videos: the frames are encoded in a forward traversal in time, and in a negative traversal of time. The ordering of the frames for the forward traversal in time for one example is $I_1\ P_f P_f P_f I_2\ P_f P_f P_f I_3$ and the ordering of the frames for the negative traversal of time for the example is $I_3\ P_r P_r P_r I_2\ P_r P_r P_r I_1$ where $P_f$ is a forward P-frame, $P_r$ is a reverse P-frame, and $I_{1-3}$ are different I-frames shared by both videos. In alternative embodiments, bi-directional viewing and corresponding encoding is not provided for one or more segments.

Upon examining the overlap of frame orderings for the forward and backward traversal of time, a redundancy in the I-frames is observed. The first frame of the forwards traversal movie is $I_1$ and the final frame of the backwards traversal movie is also $I_1$. There is no need to store that encoded frame twice. Instead, the movie data for both traversals in time is interleaved together and makes use of shared I-frames.

Each node 30 in the video graph stores the encoded raw frame or frames for that point in time. The data available at every node in the video graph is either an encoded I-frame or an encoded P-frame, but other formats may be used.

In act 38 of FIG. 8, the server serves the videos from the video graph to a client device. The videos are served as needed, such as based on user selection of nodes. Alternatively or additionally, videos for other parts of the video graph are served and stored by the client device for later viewing.

The use of the video graph allows the client device to implement interactivity. The user may make changes without requiring re-rendering. From a user perspective, the user may change the preset, view direction, and/or location in the volume using the video of high quality renderings. A simple movie player capable of decoding is used. The video graph may not be displayed to the user, but is instead used to indicate availability of interaction to the user. Alternatively, the video graph is presented to the user in order to assist in navigation. The user selects nodes to navigate spatially and/or through presets.

In one embodiment, the video player is used to play the encoded video graph. Whenever the user stops at I-frames, the available preset segments 42 or segments 42 are displayed for the user to choose, and a slider is enabled for the user to interact with preset segment 42. The video player uses the video graph data structure to buffer and cache decoded I-frames to achieve better performance. The video player may also populate the underlying 3D paths (e.g., centerlines of vessel tree) for a user to choose which branch to navigate.

FIG. 15 shows one embodiment of a method for interactive viewing in medical imaging. The operation of the video decoder or movie viewer on the client device is provided. The interactivity allows the user or viewer to change view direction, seek point navigation, and/or preset variation despite the video having been pre-rendered. In the example discussed below, the user interacts to change the view direction.

Additional, different, or fewer acts may be provided. For example, acts for decoding the video are provided. The acts are performed in the order shown or a different order. For example, acts 50 and 52 are performed in the order shown, a reverse order, or simultaneously.

In act 50, the video player of the client device receives one or more videos. The client device receives the video from the server. The video includes multiple images forming a view surrounding all or at least part of each of a plurality of positions along a path through a medical scan volume. By including multiple images for each point in the video or videos, the video player may create different images based on different combinations of the images for a given point.

In one embodiment, the video includes one frame that is a stitching together of images rendered from different views. The video player may separate the component images to display the appropriate one or to create a new image from the combination. In another embodiment, one video includes an image from one view direction and a different video includes an image from another view direction, both for the same point. The video player may select the image to display for the point or may create a new image for display from the images of the multiple videos.

The video frames for the images are compressed. For example, H264 I-frame and P-frames are used. For some positions, the images to be displayed are decoded from I-frames. For other positions, the images to be displayed are decoded from P-frames and previously cached images.

The received video may be part of a video graph. Alternatively, the received video is for a single path or segment.

In act 52, a user input device obtains user input of a view direction. The user inputs an absolute value or values indicating the view direction. Alternatively, the user indicates a change from a default, such as by clicking and dragging an icon or image to represent rotation from a currently displayed view. The video may be paused to allow the user to interact with the displayed image. Any now known or later developed interaction to indicate view direction may be used.

The obtained view direction is to be applied for the current location represented in the displayed image and/or to other locations represented in the video as well.

For other interaction (e.g., change of preset or navigation to a seek location), a video graph may be provided. The user selection on the video graph indicates the desired change. Alternatively, the video player uses the video graph to provide icons representing available options for interaction. The user selects the icons to interact. Other interaction may be provided.

In act 54, the processor of the client device extracts parts of the different images for the same location in or outside the volume. The video or videos provide images for a given location from different view directions (i.e., default view directions used to pre-render without user input). The user input view direction defines a field of view entirely within one of the images of the video or partially within different images for the video or videos. Where multiple images represent the user selected field of view, the parts of the images are extracted from the corresponding frames of video or videos. The parts are stitched together to create an image for the user selected field of view. For example, portions of images from different video streams for a given location are extracted. The portions are combined to form a new image for a view direction different than used for rendering the images in the first place.

In act 56, the client device generates an image on a display of the client device from the extracted parts. The combined parts provide an image for the user selected view direction. This image is displayed. For example, a medical image representing a scanned volume is displayed. The medical image represents a given field of view at the location in the volume. The user may alter the field of view despite relying on pre-rendered images of the video, allowing interaction to review anatomy or medical scan information without repeating the processing required to render from the volume and without requiring the client device to store the volume data.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A non-transitory computer readable storage medium having stored therein data representing instructions executable by a programmed processor for interactive viewing in medical imaging, the storage medium comprising instructions for:

generating a video graph having multiple segments, at least a first segment of the segments branching at a first exit node into a second segment of the segments and a third segment of the segments, the first segment comprising a first plurality of sequential nodes including at least an entrance node and the first exit node, the second segment comprising a second plurality of sequential nodes including at least the first exit node and a second exit node, and the third segment comprising a third plurality of sequential nodes including at least the first exit node and a third exit node;

rendering images for each of the first plurality of sequential nodes, the second plurality of sequential nodes, and the third plurality of sequential nodes from the medical scan data representing a volume;

encoding with a video codec, the images of the entrance node, the first exit node, the second exit node, and the third exit node as intra-encoded frames and the images of others of the nodes of the first plurality of sequential nodes, the second plurality of sequential nodes, and the third plurality of sequential nodes as predictive-encoded frames;

generating a first video from images of the first plurality of sequential nodes, a second video from images of the second plurality of sequential nodes, and a third video from images of the third plurality of sequential nodes;

and serving the first, second, and third videos to a client device upon request based on user selection of nodes, wherein only the entrance node, the first exit node, the second exit node, and the third exit node are user selectable.

2. The non-transitory computer readable storage medium of claim 1 wherein generating comprises generating the first and second segments as different spatial paths through the volume.

3. The non-transitory computer readable storage medium of claim 1 wherein generating comprises generating the first segment as a spatial path through the volume and generating the second segment as a change in rendering parameters for a location on the spatial path.

4. The non-transitory computer readable storage medium of claim 1 wherein encoding comprises encoding separate video streams for the first segment with the separate video streams progressing along the first segment in different directions.

5. The non-transitory computer readable storage medium of claim 1 wherein rendering the images comprises rendering multiple of the images for one of the nodes of the first plurality of nodes or the second plurality of nodes, the multiple images for the one node comprising fisheye images from different directions at a location.

* * * * *